United States Patent

Klein

[15] 3,653,759

[45] Apr. 4, 1972

[54] AUTOMATIC CONTROL OF COLOR CORRECTION OF PHOTOGRAPHIC PRINTERS

[72] Inventor: William C. Klein, Rochester, N.Y.

[73] Assignee: Eastman Kodak Company, Rochester, N.Y.

[22] Filed: Dec. 8, 1970

[21] Appl. No.: 96,039

[52] U.S. Cl. ..............................355/38, 178/5.2 A, 356/175

[51] Int. Cl. ..............................G03b 27/78

[58] Field of Search................355/38, 83, 84, 88; 178/5.2 A; 356/175, 222, 226

[56] References Cited

UNITED STATES PATENTS

| | | | |
|---|---|---|---|
| 3,110,761 | 11/1963 | Allen et al. | 178/5.2 A |
| 3,120,782 | 2/1964 | Goddard et al. | 355/38 |
| 3,220,304 | 11/1965 | Clapp | 355/38 |
| 3,502,410 | 3/1970 | King et al. | 355/38 X |

*Primary Examiner*—Samuel S. Matthews
*Assistant Examiner*—Richard A. Wintercorn
*Attorney*—W. H. J. Kline

[57] ABSTRACT

Apparatus for controlling and continuously varying the color correction level of the printing beam of a color printer from a low color correction level to a high color correction level in proportion to the detected red, green and blue LATD's of the negative. A color balanced negative is printed with low color correction. A higher degree of color correction is automatically applied in accordance with the degree of imbalance of the color composition of the negative; and a high color correction level is applied to alter the color composition of the printing beam when the negative exhibits an illuminant failure.

14 Claims, 3 Drawing Figures

WILLIAM C. KLEIN
INVENTOR.
BY Joseph F. Breimayer
R L Hampton
ATTORNEYS

WILLIAM C. KLEIN
INVENTOR.
BY Joseph F. Breimayer
R L Hampton
ATTORNEYS

AUTOMATIC CONTROL OF COLOR CORRECTION OF PHOTOGRAPHIC PRINTERS

BACKGROUND OF THE INVENTION

1. Field of the Invention

This invention relates to photographic apparatus, and more particularly to apparatus for automatically altering the color composition of the printing beam of a color printer in accordance with the degree of color balance of a negative to be printed.

2. Description of the Prior Art

In subtractive color printers, for example, it is common practice to illuminate a color transparency, either positive or negative, with a broad band radiation source, e.g. white light, and to project an image of the illuminated transparency in a printing beam onto a sheet of color print material. Three subtractive primary filters $F_c$ (cyan), $F_m$ (magenta) and $F_y$ (yellow) may be arranged to be selectively movable into and out of the printing beam of the projected image. The color composition of the printing beam may be monitored by three photosensitive devices which are selectively responsive to the density of the red, green and blue color components of the projected image. Each of the photosensitive devices may be connected to a capacitor which, under the influence of the output signal from the photosensitive device, charges to a predetermined voltage. As each capacitor charges to the predetermined voltage, a corresponding one of the three subtractive primary filters $F_c$, $F_m$ and $F_y$ is inserted into the printing beam. For example, after a time delay directly dependent upon the intensity of red light striking the red photosensitive device, the cyan filter $F_c$ is inserted into the printing beam to halt the red exposure of the sheet of color print material. Similarly, the blue exposure of the sheet of color print material is halted when the yellow filter $F_y$ is inserted into the printing beam; and the green exposure is halted when the magenta filter $F_m$ is inserted into the printing beam. When all three filters are moved into the printing beam, the exposure is stopped, since, theoretically, all light is cut off from the printing beam by the filters; however, as a safeguard, an opaque shutter is usually inserted thereafter into the printing beam. A color printer similar to that herebefore described is disclosed in U.S. Pat. No. 3,184,307, issued May 18, 1965, and assigned to Eastman Kodak Company.

The rate at which the associated capacitors charge to the predetermined voltage sufficient to insert the color filters is dependent upon the red, green and blue large area transmission densities (LATD) of the negative to be printed. The color balance of an average population of negatives that the printer must accommodate widely varies from a normal or average color balance wherein the red, green and blue LATD's are relatively equal. A basic assumption of the large area monitoring concept is that the LATD's are representative of the densities of the principle subject area of interest in the negative. Thus, if the principle subject of interest is photographed against a background of predominantly blue sky or water, such as a distant water skier or sailboat, the large area density monitoring system does not sense the fact that the unusually high blue density of the negative is not typical of the principle subject area of interest. When the full color correction capabilities of the exposure determination system are utilized as described hereinbefore, the blue exposure will be terminated quickly and the color balance of the resulting print will be objectionably yellow. Such a print is referred to as a color subject failure resulting from a predominance of one color in the scene captured by the negative. Obviously, color subject failures are not limited to any particular colors, but the most frequently encountered cases are associated with red backgrounds (furniture, clothing, etc.), green grass of foliage, and blue sky or water.

In order to prevent the printing of color subject failures, it has been found desirable to reduce the high color correction level of the exposure determining system described above by a linear combination of the red, green and blue LATD's of the negative to be printed. Thus the red exposure, for example, is made a function of all three LATD's rather than being based on red transmittance alone. In U.S. Pat. No. 3,120,782 issued Feb. 11, 1964, to Goddard et al., and assigned to Eastman Kodak Company, there is disclosed a system that has made it possible to manually adjust the rate of correction which the printer will introduce for variations in the LATD's of the population of negatives being printed.

However, there are another class of errors produced by sensitometric problems associated with camera exposure level, spectral quality of the exposing illuminant, film deterioration due to improper storage, processing variations and so forth, that require high levels of correction. The introduction of dual purpose color films designed to be exposed with either daylight or artificial illumination, as distinguished from earlier single purpose color films which were balanced for use with only one type of light, i.e., only daylight or artificial light, has resulted in a class of illuminant failure negatives, e.g., negatives erroneously exposed with tungsten lamps. In order to compensate for such sensitometric errors, it is necessary to maintain a high color correction level during printing.

Thus very low rates of correction for LATD variability are desirable when printing negatives which are normal in the sensitometric sense but abnormal in the sense that the distribution of colors in the original scene is unequal, i.e., when the negative exhibits a color subject failure. Further, relatively high rates of color correction for LATD variability are desirable when printing negatives which are abnormal in the sensitometric sense, i.e., illuminant failure negatives. This general problem is discussed at length in an article in the Journal of SMPTE, Apr. 1956, entitled "Exposure Determination Methods for Color Printing: The Concept of Optimum Correction Level" by Bartelson and Huboi. The authors conclude that there is an optimum compromise correction level for any integrated transmittance printing system which can be derived using linear regression techniques to provide the best statistical fit to the characteristics of the negative or transparency population being printed. In general, this optimum correction level falls in the range of 70% to 90% of full correction, dependent on the season of the year.

Color subject failure remains a serious problem, however, even at correction levels as low as 70%. In more typical situations, where correction levels of 85% to 90% are requires to adequately normalize the real errors in the negative or transparency population, the anomalous errors due to scene attributes result in extremely poor quality prints.

The production of such prints is wasteful of paper and time, since inspection of the prints and reprinting are required in order to maintain high standards of color printing.

SUMMARY OF THE INVENTION

Accordingly, it is an object of the present invention to reduce the number of color subject failure and illuminant failure prints produced from a normal population of negatives.

It is also an object of the present invention to determine from the red, green and blue LATD's of a negative, the color correction level necessary to produce a color balanced print therefrom.

Another object of the invention is to vary the color correction level employed in printing a negative in accordance with a function of the red, green and blue LATD's of the negative to be printed.

It is also an object of the present invention to provide a gradual transistion from a low color correction level to a high color correction level in accordance with a function of the red, green and blue LATD's of the negative to be printed.

A preferred embodiment of the present invention is disclosed in connection with the exposure control system of the color printer which comprises means to change the mode of operation of a color printer from a low color correction mode required for normal negatives and color subject failure negative to a relatively high color correction mode required for the correction of abnormal sensitometric errors, such as illuminant failure negatives. A high level of density correction is maintained in both modes of operation.

More particularly, in accordance with one preferred embodiment of the invention exposure control apparatus is provided for controlling the degree of color correction in response to first and second radiation signals generated by first and second radiation sensitive devices, each sensitive to radiation of a different wavelength in the printing beam of a photographic printer. Means responsive to the first and second radiation signals produce a third signal having a periodic wave form of first and second amplitude, the durations of the first and second amplitudes being dependent upon the first and second radiation signals. Further means responsive to the first amplitude of the third signal introduce a high degree of color correction in the printing beam of the photographic printer and, responsive to the second amplitude of the third signal, introduce a low degree of color correction in the printing beam.

The high degree of color correction is provided by means responsive to each individual radiation signal for determining the individual exposure time periods of print material to the first and second wavelengths. The low degree of color correction is provided by means responsive to a combination of the first and second radiation signals for determining a common exposure time period for the print material to the first and second wavelengths.

The operation of the preferred embodiment of the invention in the modes to be described hereinafter advantageously reduces the number of faulty prints produced by an automatic color printer.

Other objects and advantages of the invention will become more apparent from the following description taken in conjunction with the accompanying drawings.

BRIEF DESCRIPTION OF THE DRAWINGS

In the detailed description of the preferred embodiment of the invention presented below, reference is made to the accompanying drawings in which.

DESCRIPTION OF THE PREFERRED EMBODIMENT

Figure 1:
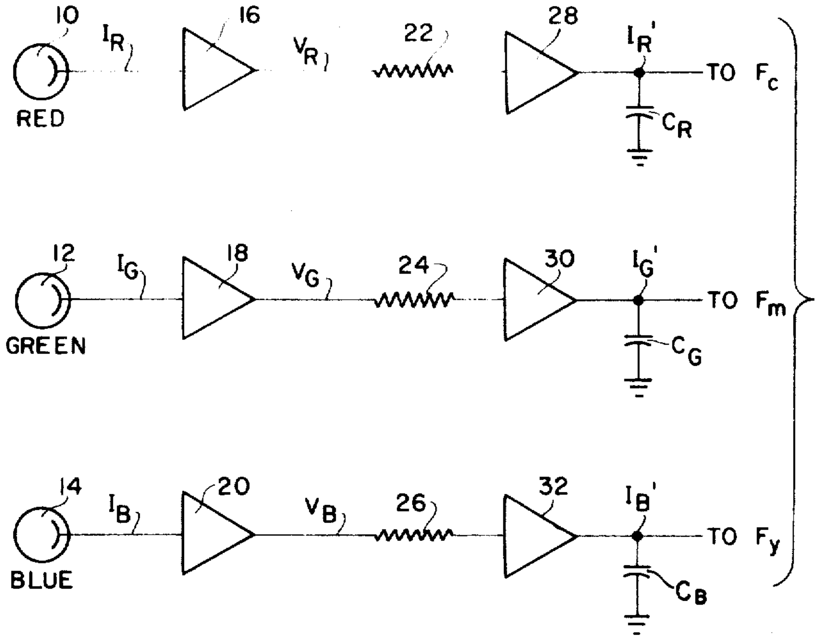
FIG. 1 (PRIOR ART)
FIG. 1 is a circuit diagram of a prior art filter control operative in a high color correction mode.

Referring now to the drawings and first to FIG. 1, there is shown a high color correction circuit known in the prior art which consists of three separate integrating circuits that are exclusively responsive to the red, green and blue LATD's of the projected image of the negative to be printed, to insert the cyan, magenta and yellow subtractive filters into the printing beam upon the charging of capacitors $C_r$, $C_g$ and $C_b$ to a predetermined voltage level. More particularly, the red, green and blue photosensors 10, 12 and 14 are located with respect to the printing beam of a color printer (not shown) to detect the red, green and blue LATD's of the negative and to generate respective photocurrent signals $I_r$, $I_g$ and $I_b$ having a magnitude dependent thereon. The three photo-current signals $I_r$, $I_g$ and $I_b$ are applied to the input terminals of amplifiers 16, 18 and 20, respectively, which transform the current signals to voltage signals $V_r$, $V_g$ and $V_b$, respectively. The amplification of amplifiers 16, 18 and 20 may be preset to produce an acceptable print from a color balanced reference negative, exposed to daylight or blue flash, and the amplification need not be altered thereafter. The voltage signals $V_r$, $V_g$ $V_b$ are applied through attenuating resistors 22, 24 and 26, respectively, to the input terminals of amplifiers 28, 30 and 32 which transform the voltage signals $V_r$, $V_g$ and $V_b$ into charging current signals $I_r'$, $I_g'$ and $I_b'$, respectively. The charging current signals $I_r'$, $I_g'$ and $I_b'$ simultaneously charge capacitors $C_r$, $C_g$ and $C_b$ to a predetermined voltage level which, when attained, is sufficient to energize printer filter controls that insert the filters $F_c$, $F_m$ and $F_y$ into the printing beam.

The high color correction circuit of FIG. 1 controls the exposure time for each of the three printing colors exclusively from the detected red, green and blue LATD's. The circuit of FIG. 1 is sufficient to satisfactorily control the printing of normal negatives having substantially equal densities of red, green or blue and also to control the printing of negatives that exhibit illuminant failure.

Figure 2:
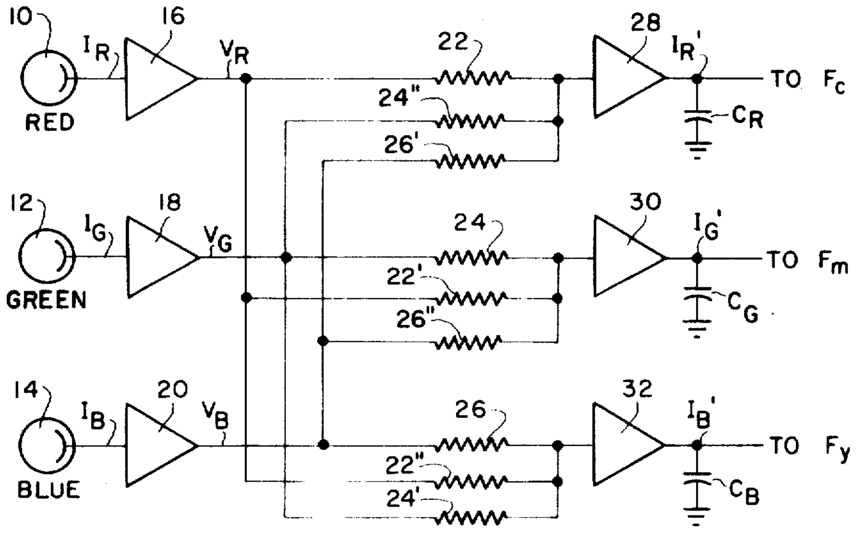
FIG. 2 (PRIOR ART)
FIG. 2 is a circuit diagram of the prior art filter control of FIG. 1 modified to operate in a low color correction mode.

The low color correction circuit of FIG. 2 is a modification of the high color correction circuit of FIG. 1 that is provided by the interconnection of the impedance circuits including the resistors 22', 24', 26', 22'', 24'' and 26''. Assuming that the resistors are equal in value, the impedance circuits operate to equalize the voltage signals $V_r'$, $V_g'$ and $V_b'$ and to consequently equalize the printing times for the red, green and blue colors. A printer operating in a low color correction mode as described is referred to as a "color blind" printer, since the three filters $F_c$, $F_m$ and $F_y$ are inserted into the printing beam of the printer substantially simultaneously regardless of the color balance of the negative. Thus a "color blind" printer will satisfactorily control the printing of a normal, color balanced negative.

Normally, however, the interconnecting resistors are varied in value in known mathematical relationships to establish a standard level of color correction suited to the characteristics of the source of light for the printing beam, the type of negative to be printed, and the type of paper upon which the print is to be made. Once established for any particular printer and sensitized strip, these resistance values may be left untouched until changed by the operator of the printer to compensate for observed variations in the negatives, such as under or over exposed negatives and/or negatives having unusual or undesirable color balance. Further explanation of the operation of a low color correction circuit such as that depicted in FIG. 2 may be obtained from the explanation of the circuitry disclosed in the aforementioned Goddard et al. U.S. Pat. No. 3,120,782.

As it is desirable to increase the speed of color printers, it has been found necessary to automate many functions previously performed by an operator of the printer. In accordance with the teachings of the present invention, there is shown in the preferred embodiment of FIG. 3 a color correction circuit responsive to the integrated red, green and blue LATD's of the negative to be printed that automatically provides a continuously variable low to high color correction that will balance color subject failure and illuminant failure negatives. The circuit of FIG. 3 eliminates the necessity of inspection of the negative to be printed by an operator, and it eliminates the situation wherein two similar negatives near the illuminant failure threshold would be printed differently — one with high color correction and the other with low color correction.

Figure 3:
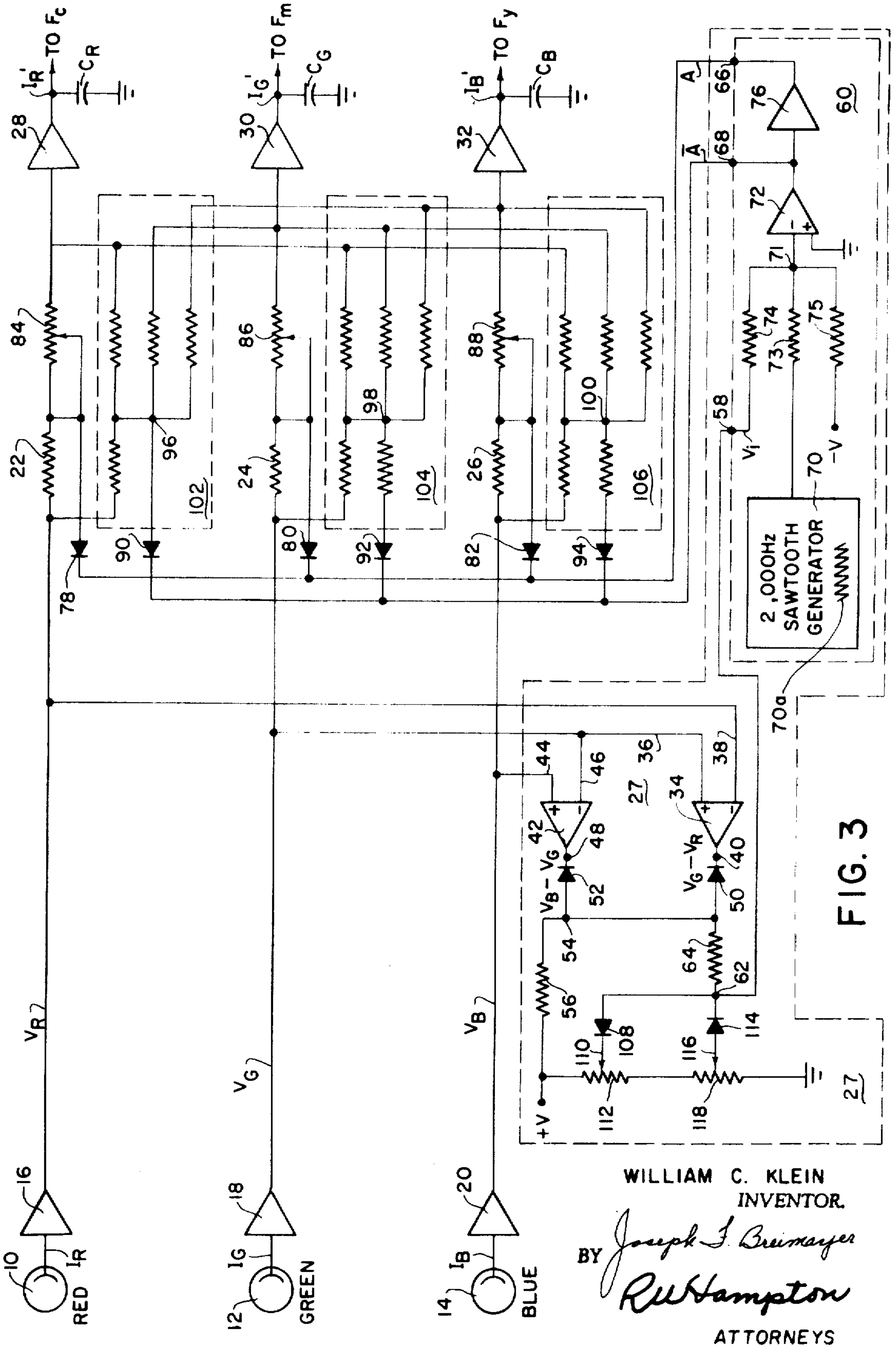
FIG. 3 is a circuit diagram of an illuminant failure detector and clamp signal generator in conjunction with a filter control selectively operative in a high color correction mode and a low color correction mode.

Referring now to FIG. 3, there is shown a color correction circuit which includes certain elements common to the color correction circuits of FIGS. 1 and 2, namely the red, green and blue photosensors 10, 12 and 14 connected respectively to the input terminals of amplifiers 16, 18 and 20, respectively. The high color correction impedances 22, 24 and 26, respectively, are connected between the output terminals of the amplifiers 16, 18 and 20 and the input terminals of amplifiers 28, 30 and 32, respectively. The integrating capacitators $C_r$, $C_g$ and $C_b$ are connected to the output terminals of the amplifiers 28, 30 and 32, respectively. In accordance with the teachings of the present invention, an illuminant failure detector circuit 27, connected to the output terminals of the amplifiers 16, 18 and 20, generates a pair of control signals A and $\bar{A}$ which switch the color correction circuit from a normal low color correction mode, provided by the interconnecting impedance networks 102, 104 and 106, to a high color correction mode, provided by the impedances 22, 24 and 26, over a variable proportion of the total printing time.

A negative exhibiting illuminant failure may produce LATD voltage signals such that $V_b > V_g > V_r$, due to the fact that daylight and blue flash type film exposed to a warmer illuminant, such as a tungsten lamp, which is deficient in blue and green light, results in a negative which has a low density of blue and green. A print made from such a negative exhibits an extreme reddish-yellow hue due to the lack of the aforementioned colors in the illuminating light. The illuminant failure detector circuit 27 is responsive to the LATD voltage signals $V_b$, $V_g$ and $V_r$ to provide the proper color correction to produce a color balanced print. However, the illuminant failure detector circuit 27 may erroneously respond to a relatively small number of color subject failures, wherein the predominant colors of a scene are red and yellow, to produce an improperly corrected print interpreted as an illuminant failure.

The illuminant failure detector circuit 27 includes the electrical components enumerated hereinafter and including a first differential amplifier 34 having a first input terminal 36 connected to the output terminal of amplifier 18 and a second input terminal 38 connected to the output terminal of amplifier 16 and an output terminal 40. The differential amplifier 34 operates to subtract the LATD voltage signal $V_r$ at input terminal 38 from the LATD voltage signal $V_g$ at input terminal 36 to produce a first voltage difference signal $V_g - V_r$ at output terminal 40. A second differential amplifier 42 has a first input terminal 44 connected to the output terminal of amplifier 20, a second input terminal 46 connected in common with the first input terminal 36 of differential amplifier 34 to the output terminal of amplifier 18. The differential amplifier 42 is operative to subtract the LATD voltage signal $V_g$ at input terminal 46 from the LATD voltage signal $V_b$ at input terminal 44 to produce a second voltage difference signal $V_b - V_g$ at output terminal 48. The output terminals 40 and 48 of the differential amplifiers 34 and 42, respectively, are connected to the cathodes of diodes 50 and 52, respectively. Diodes 50 and 52 are connected at their anode terminals to the conductor 54 which is connected to a positive voltage source + V through a relatively large resistor 56. The conductor 54 is also connected to the input terminal 58 of variable pulse width oscillator (VPWO) 60 through conductor 62 and resistor 64.

The variable pulse width oscillator (VPWO) 60 may be of any suitable design that is operative to produce a pair of complementary control signals A and $\bar{A}$ having a substantially constant frequency, e.g. 2,000 Hz, that is selected to have a short period with respect to the total printing time of an average negative, at its output terminals 66, and 68, respectively. The control signals A and $\bar{A}$ are designed to have complementary square wave forms that are either at a high voltage level $+ V_b$ or at ground potential for reasons set forth in the description of the operation of the apparatus of FIG. 3. The VPWO 60 is responsive to the voltage level of the input signal $V_i$ applied at its input terminal 58 to vary the square wave pulse width of the 2,000 Hz control signals A and $\bar{A}$ in proportion thereto.

The VPWO 60 may consist of a free running sawtooth wave form signal generator 70 that is operative to continuously produce a 2,000 Hz sawtooth wave form voltage signal having a maximum and minimum positive voltage amplitude and a short rise time which is illustrated as 70*a*. The sawtooth wave form signal 70*a* is applied to the negative input terminal 71 of operational amplifier 72 through resistor 73. The negative input terminal 71 of the operational amplifier 72 is further connected to the input terminal 58 of the VPWO 60 through resistor 74. A negative bias voltage $-V$ is also applied to the negative input terminal 71 of the operational amplifier 72 through resistor 75. The absolute value of the voltage V is selected to exceed the absolute value of the sum of the maximum voltage level of the sawtooth wave form signal 70*a* and the minimum voltage level of the input signal $V_i$ applied at input terminal 58 so that, in the absence of input signal $V_i$ at input terminal 58 exceeding the minimum voltage level, the operational amplifier 72 develops a 0 voltage or ground potential output signal at its output terminal. A further operational amplifier 76 is connected at its input terminal to the output terminal of the operational amplifier 72 and is operative to invert the output signal of the operational amplifier 72. The output terminals 66 and 68 of the VPWO 60 are connected to the output terminals of the operational amplifiers 76 and 72, respectively.

The VPWO 60 operates as follows. The DC voltage level of the input signal $V_i$ applied to input terminal 58 is summed with the instantaneous voltage of the 2,000 Hz saw-tooth wave form 70*a* and the negative bias voltage $-V$ at the negative input terminal 71 of the operational amplifier 72. As the DC voltage level of the input signal $V_i$ increases, the net input signal to the operational amplifier 72 becomes positive for a time duration in each cycle when the instantaneous voltage of the 2,000 Hz sawtooth wave form signal 70a and the input signal $V_i$ exceeds the sum of the negative bias signal $-V$. Operational amplifier 72 amplifies the net input signal at input terminal 71 to produce control signal $\bar{A}$ at terminal 68 having a voltage level $+V_b$. The control signal $\bar{A}$ is inverted by amplifier 76 to provide the complementary control signal A at output terminal 66. Thus, when the control signal A is at the high voltage level $+V_b$ in each cycle, the control signal $\bar{A}$ is at ground potential, and, in the portion of each cycle that control signal A is at ground potential, the control signal $\bar{A}$ is at the high voltage level $+V_b$. The portion of each cycle in which the complementary control signals A and $\bar{A}$ are at the high voltage level $+V_b$ is therefore dependent upon the voltage level of the input signal $V_i$ at the input terminal 58.

In the manner described, the VPWO 60 is operative to produce control signals A and $\bar{A}$ that have complementary pulse widths during each cycle of the 2,000 Hz sawtooth wave form signal 70*a* that are dependent upon the DC voltage level applied at the input terminal 58.

The output terminal 66 of the VPWO 60 is connected to the cathodes of diodes 78, 80 and 82 which are connected at their anodes to the common terminal of high color correction resistors 22, 24 and 26, respectively, and variable resistors 84, 86 and 88, respectively. When the control signal A produced at output terminal 66 is at the high voltage level $+ V_b$, the diodes 78, 80 and 82 do not conduct current. However, when the control signal A is at ground potential, the diodes 78, 80 and 82 conduct current to ground, and the interconnecting point between the resistors 22 and 84, 24 and 86, and 26 and 88 is at ground potential. The variable resistors 84, 86 and 88 are provided to prevent the input terminals of amplifiers 28, 30 and 32, respectively, from being driven to ground potential.

The output terminal 68 of the VPWO 60 is connected to the cathodes of diodes 90, 92 and 94. The anodes of diodes 90, 92 and 94 are connected to the common terminals 96, 98 and 100 of the low color correction circuits 102, 104 and 106. The low color correction circuits 102, 104 and 106 are substantially identical to the low color correction circuits of FIG. 2, and each low color correction circuit includes a plurality of impedances that are operative to connect the output terminals of amplifiers 16, 18 and 20 to all the input terminals of the amplifiers 28, 30 and 32. When the control signal $\bar{A}$ produced at the output terminal 68 is at the high voltage level $+ V_b$, the diodes 90, 92 and 94 are reverse-biased and do not conduct current from the interconnecting points 96, 98 and 100. Therefore, the circuit operates in the low color correction mode as the voltage signals $V_r$, $V_g$ and $V_b$ are summed together at the input terminals of the amplifiers 28, 30 and 32. However, when the control signal $\bar{A}$ is at ground potential, the diodes 90, 92 and 94 conduct current from the interconnecting points 96, 98 and 100. Thus, the low color correction circuits 102, 104 and 106 are disabled, since the interconnecting points 96, 98 and 100 are at ground potential.

Thus it can be readily observed that when the control signal A is at the high voltage level $+V_b$, the control signal $\bar{A}$ is at ground potential and the low color correction circuits 102, 104 and 106 are disabled, and the circuit operates in the high color correction mode; and when the control signal $\bar{A}$ is at the high voltage level + $V_b$, the control signal A is at ground potential and the high color correction circuits 22, 24 and 26 are disabled, and the circuit operates in the low color correction mode.

Returning now to the development of the input signal $V_i$ at the input terminal 58 of the VPWO 60, it will be recalled that a first difference signal $V_g - V_r$ and a second difference signal $V_b - V_g$ are applied to the cathode terminals of the diodes 50 and 52 in the illuminant discriminator circuit 27. The voltage source +V is chosen to exceed the maximum voltage level attainable by the first and second difference signals. Thus, the diodes 50 and 52 are forward-biased. However, only one of the two diodes 50 and 52 will conduct current, and that diode will be the one across which is developed the greatest voltage drop. For example, if difference signal $V_g - V_r$ is larger than difference signal $V_b - V_g$, the voltage level of the signal developed on the conductor 54 will be equal to the difference signal $V_b - V_g$. In this example, the diode 50 will not conduct current because the voltage level of conductor 54 becomes lower than the difference signal $V_g - V_r$ when diode 52 conducts current. Therefore the voltage level of the input signal $V_i$ established at the input terminal 58 of the VPWO 60 is directly related to the least positive voltage of the first and second difference signals.

The signal developed on the conductor 54 is conducted by resistor 64 to the input terminal 58 of VPWO 60. The voltage level of the input signal $V_i$ at the input terminal 58 is operative to control the pulse width of the square wave complementary signals A and $\bar{A}$ in the manner described hereinbefore. In the event it is considered desirable to limit the voltage level range of the signal applied at the input terminal 58, there are shown further circuit elements which provide a maximum and minimum voltage level. A diode 108 is connected at its anode terminal to point 62 and at its cathode terminal to the movable contact arm 110 of a rheostat 112. In like manner, a diode 114 is connected at its cathode terminal to point 62 and at its anode terminal to the movable contact arm 116 of the rheostat 118. The rheostats 112 and 118 have a relatively low total impedance with respect to the impedance of resistor 56 and are connected in series between the positive voltage source + V and ground potential.

The setting of movable contact arm 110 of rheostat 112 determines the maximum voltage level of the signal developed at point 62, because the diode 108 is rendered conductive when the voltage level at point 62 exceeds the voltage level determined by the setting of movable contact arm 110. In a similar manner, the setting of movable contact arm 116 of rheostat 118 establishes the voltage level below which the signal developed at point 62 cannot fall. The diode 118 is rendered conductive if the voltage at point 62 becomes less than the voltage level established by the setting of movable contact arm 116.

Movable contact arm 110 is normally set to a voltage level that is sufficient, when applied at the input terminal 58 of the VPWO 60, to exceed the maximum voltage attained by the sum of the sawtooth wave form 70a and the negative bias voltage −V to therefore prevent the operational amplifier 72 from producing a positive voltage signal + $V_b$ at its output terminal. Therefore, as explained hereinbefore, control signal A will be at ground potential, whereas control signal A will be at the voltage + $V_b$. Similarly, the movable contact arm 116 may be set at a voltage that is less than the sum of the minimum voltage of the sawtooth wave form *70a* and the negative bias voltage −V. In the latter case, the operational amplifier 72 will produce a positive voltage signal + $V_b$ at its output terminal during 100% of the printing time, thus switching control signal $\bar{A}$ to the high voltage level + $V_b$ and control signal A to ground potential.

It should be understood to one having ordinary skill in the art that the VPWO 60 could be operated satisfactorily with or without the establishment of maximum and minimum voltage levels at point 62 as described hereinbefore.

The color correction circuit of FIG. 3 is operative in accordance with the present invention to provide a variable amount of color correction that is directly proportional to the degree of illuminant failure in the negative to be printed. When the negative to be printed exhibits an illuminant failure of the type described hereinbefore, the voltage signals $V_b$ and $V_g$ are relatively high, and the input signal $V_i$ developed at input terminal 58 of VPWO 60 is the lower of the two relatively large difference signals $V_b - V_g$ or $V_g - V_r$. In this instance, the control signals A and $\bar{A}$ are at a positive voltage and ground potential, respectively, for a period approaching 100% of each cycle of the VPWO 60. Thus, the color correction circuit of FIG. 3 operates primarily in the high color correction mode since the points 96, 98 and 100 of the low color correction circuits 102, 104 and 106 are at ground potential.

A negative which exhibits only slight illuminant failure, such as mixed light sources, is represented by difference signals $V_b - V_g$ and $V_g - V_r$ which vary in proportion to the degree of difference between the signals $V_r$, $V_g$ and $V_b$. The signal $V_i$ developed at the input terminal 58 of the VPWO 60 also reflects the degree of illuminant failure of the negative, and it is operative to produce control signals A and $\bar{A}$ having complementary pulse widths that are between 0 and 100% of each cycle of the VPWO 60. Therefore, during each cycle, the diodes 78, 80 and 82 are rendered nonconductive for the initial portion of the cycle and conductive for the remainder of each cycle. Conversely, the diodes 90, 92 and 94 are rendered conductive for the initial portion of each cycle and nonconductive for the remainder of each cycle. Therefore, for the initial portion of each cycle, the color correction circuit of FIG. 3 is operative in a high color correction mode, and for the remaining portion of each cycle, the color correction circuit is operative in the low color correction mode. Thus, the color correction applied in any instance is directly proportional to the degree of detected illuminant failure.

When the negative to be printed does not exhibit an illuminant failure, the difference signals $V_b - V_g$ and $V_g - V_r$ are relatively low positive voltages or negative voltages, and the input signal $V_i$ is equal to the minimum voltage established by the setting of movable contact arm 116. The minimum voltage level applied at input terminal 58 is effective to produce complementary clamping signals A and $\bar{A}$ which are at ground potential and the voltage + $V_b$, respectively, for 100% of each cycle of the VPWO 60. Thus the color correction circuit of FIG. 3 is operative in the low color correction mode.

In summary, the circuit of FIG. 3 is normally operative in the low color correction mode shown and described with respect to FIG. 2. An illuminant failure negative or a negative exhibiting a preponderance of red or yellow is detected by an illuminant failure detection circuit which produces variable width clamping signals A and $\bar{A}$ which operate to switch the color correction of the circuit to a high color correction mode. Furthermore, the illuminant failure detector circuit sensitive to the degree of illuminant failure to control the percentage of time in each cycle of the VPWO that the circuit operates in the low color correction mode and the high color correction mode.

From the description of the preferred embodiments set forth above, it is apparent that the invention can be practiced in many alternative ways. It is apparent that the invention may be practiced in substantially the same manner as disclosed in the preferred embodiment to correct for a detected imbalance in the voltage signals $V_r$, $V_g$ and $V_b$ that does not satisfy the relationship $V_b > V_g > V_r$. Furthermore, it is apparent that the invention may be modified to automatically control the color correction employed in additive as well as subtractive color printing.

It will be obvious that the VPWO 60 and the color correction circuit may take many forms consistent with the principles of color correction set forth hereinbefore. For example, it is apparent that the control signals A and $\bar{A}$ may take any form and that switching elements may be substituted for the diodes 78, 80 and 82 and 90, 92 and 94 of FIG. 3.

Also, it is apparent that the invention may be practiced in connection with a color correction circuit wherein the integrating capacitors are charged directly from the current generated by the photosensitive devices.

As may be seen a novel system has been disclosed for automatically and continuously varying the degree of color correction from a low color correction mode to a high color correction mode in response to the detected degree of illuminant failure of the negative to be printed thus increasing the speed of automatic printers and reducing the number of unsatisfactory prints.

The invention has been described in detail with particular reference to preferred embodiments thereof, but it will be understood that variations and modifications can be effected within the spirit and scope of the invention.

I claim:

1. In a photographic printer, exposure control apparatus for controlling the degree of color correction provided in the printing beam of the photographic printer in response to first and second radiation signals generated respectively by first and second radiation sensitive devices, each of the radiation sensitive devices being sensitive to radiation of a different wavelength in said printing beam, said exposure control apparatus comprising:

a. means responsive to the first and second radiation signals generated by said first and second radiation sensitive devices for producing a third signal having a periodic wave form of first and second amplitude, the durations of the first and the second amplitudes being dependent upon the first and second radiation signals; and b. means responsive to the first amplitude of the periodic wave form of the third signal for providing a high degree of color correction in the printing beam of the color printer for the duration of the first amplitude and responsive to the second amplitude of the periodic wave form of the third signal for providing a low degree of color correction in the printing beam of the color printer for the duration of the second amplitude.

2. In a photographic printer, exposure control apparatus for controlling the degree of color correction provided in the printing beam of the photographic printer in response to radiation signals generated by a plurality of radiation sensitive devices, each of the radiation sensitive devices being sensitive to radiation of a different wavelength in said printing beam, said exposure control apparatus comprising:

a. means responsive to at least two radiation signals for producing a first signal having an amplitude dependent upon the amplitudes of the two radiation signals;

b. means responsive to the first signal for producing a first and a second control signal having first and second complementary periodic wave forms of first and second amplitudes, the durations of the first and second amplitudes being dependent upon the amplitude of the first signal;

c. means responsive to the first amplitude of the periodic wave form of the first control signal for providing a high degree of color correction in the printing beam for a duration of the printing time of the photographic printer that is dependent upon the duration of the first amplitude; and d. means responsive to the first amplitude of the periodic wave form of the second control signal for providing a low degree of color correction in the printing beam for a duration of the printing time of the photographic printer that is dependent upon the duration of the first amplitude.

3. In a photographic printer, exposure control apparatus for controlling the exposure time periods of photographic print material to first and second wavelengths of light in the printing beam of the image to be printed in response to the intensities of the respective first and second wavelengths, said exposure control apparatus comprising:

a. first means for exposing photographic print material to first and second wavelengths of light in the printing beam of the image to be printed;

b. second means adapted to halt the exposure of the photographic print material to said first wavelength after a first exposure time period;

c. third means adapted to halt the exposure of the photographic print material to the second wavelength after a second exposure time period;

d. fourth means responsive to the intensities of said first and second wavelengths of light in the printing beam and for producing respective first and second signals each having a magnitude dependent upon the respective intensities of said first and second wavelengths; and e. fifth means responsive to the first and second signals for establishing the first and second exposure time periods of the second and third means, respectively, comprising:

1. means for detecting an imbalance in the magnitudes of the first and second signals and, responsive to the detected imbalance, for producing a third signal having a magnitude related to the degree of imbalance,
2. means responsive to the third signal for producing first and second control signals having first and second complementary, periodic, wave forms of first and second amplitudes, the duration of the first amplitudes of the wave forms of the first and second control signals being dependent upon the magnitude of the third signal,
3. means responsive to the first amplitude of the wave form of the first control signal for determining said first and second exposure time periods as a function of the combined magnitudes of the first and second signals, and
4. means responsive to the first amplitude of the wave form of the second control signal for independently determining said first and second exposure time periods from the magnitudes of the first and second signal, respectively.

4. The apparatus of claim 3 wherein said second means and said third means further comprise first and second timing circuits, respectively, each having an input terminal and an output terminal and adapted to produce a first and second respective exposure terminating signal at each respective output terminal after first and second exposure time periods determined as a function of the magnitudes of the signals applied to the input terminals.

5. The apparatus of claim 4, and more particularly the fifth means thereof, wherein:

a. said means responsive to the first amplitude of the wave form of the first control signal comprises a first plurality of signal conducting circuits adapted to be connected, in response to the first amplitude of the first control signal, between said fourth means and each respective input terminal of said timing circuits to separately apply the first signal to the timing circuit of said second means and the second signal to the timing circuit of said third means; and b. said means responsive to the first amplitude of the wave form of the second control signal comprises a further plurality of signal conducting circuits adapted to be connected, in response to the first amplitude of the second control signal, between said fourth means and every one of the input terminals of said timing circuits to apply the first and second signals simultaneously to the timing circuits of second and third means.

6. The apparatus of claim 5 wherein:

a. said timing circuits of said second and third means, for the duration of the first amplitude of said first control signal, determine said first and second exposure time periods as a function of the magnitudes of said first and second signals; and b. said timing circuits of said second and third means, for the duration of the first amplitude of the second control signal, determine said first and second exposure time periods as a function of the combined magnitudes of the first and second signals.

7. In exposure control apparatus for a photographic printer comprising a plurality of filters, a plurality of photosensors corresponding to each one of said filters, each of said photosensors being sensitive to light of a different wavelength in the printing beam of said photographic printer for producing a first signal having a magnitude dependent upon the intensity of each wavelength of light, actuator means for controlling the individual insertion of each of said filters into said printing beam in response to an actuating signal, and timing means responsive to the first signals for producing each of the actuating signals, the improvement comprising:

a. first means responsive to an imbalance in the magnitudes of the first signals for producing a second signal having a magnitude dependent upon the imbalance;
b. second means responsive to the second signal for producing first and second control signals having complementary, periodic, wave forms of first and second magnitudes, the duration of the first magnitudes being dependent upon the magnitude of the second signal;
c. third means responsive to the first magnitude of the first control signal for coupling each one of the photocurrent signals to a respective one of the timing means to produce said respective trigger signals after time delays dependent upon the magnitude of each individual first signal and the duration of the first amplitude of the first control signal; and
d. fourth means responsive to the first amplitude of the second control signal for coupling each one of said first signals to every one of said timing means to produce said respective trigger signals simultaneously after a time delay dependent upon a combination of the magnitudes of all of the first signals and the duration of the first amplitude of the second control signal.

8. The improvement of claim 7 wherein said third means comprises a high color correction circuit means and said fourth means comprises a low color correction circuit means.

9. The improvement of claim 7 wherein said third means comprises:

a. first plurality of first signal conducting circuits including a plurality of switch means adapted to be closed, in response to the first amplitude of the first control signal, to conduct first signals between each one of said photosensors and each respective one of said timing means; and
b. said fourth means comprises a second plurality of first signal conducting circuits including a like plurality of switch means adapted to be closed, in response to the first amplitude of the second control signal, to conduct each one of the first signals to every one of said timing means.

10. In exposure control apparatus for a photographic printer comprising a plurality of filters, a plurality of photosensors corresponding to each one of said filters, each of said photosensors being sensitive to light of a different wavelength in the printing beam of said photographic printer for producing a photocurrent signal having a magnitude dependent upon the density of each respective wavelength of light, actuator means for controlling the individual movement of each of said filters into said printing beam in response to an actuating signal, and timing means responsive to the photocurrent signals for producing each of the actuating signals, the improvement comprising:

a. a first plurality of photocurrent signal conducting circuits adapted to connect each one of said photosensors to each respective one of said timing means to separately apply each of the photocurrent signals to each of said timing means, each of said first plurality of photocurrent signal conducting circuits further comprising a normally closed switch;
b. a second plurality of photocurrent conducting circuits adapted to connect each one of said photosensors to every one of said timing means to simultaneously apply each of the photocurrent signals to all of said timing means, each of said second plurality of photocurrent signal conducting circuits further comprising a normally open switch; and
c. means responsive to an imbalance in the magnitudes of the plurality of photocurrent signals for opening the first switches and closing the second switches for a time period dependent upon the degree of imbalance in the photocurrent signals.

11. Exposure control apparatus for a photographic printer comprising at least three subtractive filters, photosensors corresponding to each of said filters and responsive to light of a different wavelength in the printing beam of said printer for producing three photocurrent signals, actuator means for controlling the individual movement of each of said filters into said printing beam, and timing means for determining the printing time prior to insertion of said filters into the printing beam in response to said photocurrent signals comprising:

a. at least three respective high color correction circuit means responsive to each individual photocurrent signal for determining the printing time of each respective wavelength of light in the printing beam of the photographic printer;
b. at least three low color correction circuit means responsive to each of said photocurrent signals for determining a single printing time for all of the wavelengths of light in said printing beam; and
c. means responsive to an imbalance between the amplitudes of the photocurrent signals for determining the exposure time periods by either said high color correction circuit means or said low color correction circuit means, respectively.

12. The exposure control apparatus of claim 11 further comprising timing means associated with each of said three subtractive color filters and a. said photocurrent signal responsive means is responsive to the amplitude of the photocurrent signals to produce a first and a second control signal having periodic complementary wave forms, each wave form having a first and a second amplitude, the first amplitude being dependent upon the relationship between the amplitudes of the photocurrent signals;
b. said high color correction circuit means are responsive to the first amplitude of the first control signal to couple said three photocurrent signals individually to said three timing means so that the printing time of each of said wavelengths in the printing beam is dependent upon the amplitudes of each photocurrent and the duration of the first amplitude of the first control signal; and
c. said three low color correction circuit means are responsive to the first amplitude of the second control signal for coupling each of said photocurrent signals to every one of said timing means so that said single printing time of said wavelengths in said printing beam is dependent upon an average of the amplitudes of all of said photocurrent signals and the duration of the first amplitude of the second control signal.

13. The exposure control apparatus of claim 12 wherein said three subtractive filters are operative to absorb red, green and blue light, respectively, in said printing beam and said photosensor means are responsive to the intensity of the red, green and blue light, respectively, in the printing beam to produce said three photocurrent signals each having an amplitude dependent upon each respective intensity.

14. The exposure control apparatus of claim 13 wherein said photocurrent signal responsive means further comprises:

a. first means responsive to the difference between the amplitudes of the red and green photocurrent signals for producing a first difference signal having a first difference amplitude;
b. second means responsive to the difference in the amplitudes of the green and blue photocurrent signals for producing a second difference signal having a second difference amplitude;
c. third means for establishing a first reference signal having a reference period; and d. means responsive to the lower amplitude of the first and second difference signals and the period of the first reference signal for producing said first and second control signals having complementary, periodic, wave forms, the periods of which are equal to the period of the reference signal.

* * * * *